(12) United States Patent
Legallais et al.

(10) Patent No.: US 11,903,382 B2
(45) Date of Patent: *Feb. 20, 2024

(54) ORGAN PERFUSION DEVICE

(71) Applicants: UNIVERSITE DE TECHNOLOGIE DE COMPIEGNE, Compiegne (FR); CENTRE NATIONAL DE LA RECHERCHE SCIENTIFIQUE, Paris (FR); SORBONNE UNIVERSITE, Paris (FR); INSTITUT NATIONAL DE LA SANTE ET DE LA RECHERCHE MEDICALE, Paris (FR); ASSISTANCE PUBLIQUE—HOPITAUX DE PARIS, Paris (FR)

(72) Inventors: Cécile Legallais, Villiers-sous-Saint-Leu (FR); Patrick Paullier, Thourotte (FR); Olivier Scatton, Fontenay-aux-Roses (FR); Eric Savier, Paris (FR)

(73) Assignees: UNIVERSITE DE TECHNOLOGIE DE COMPIEGNE, Paris (FR); CENTRE NATIONAL DE LA RECHERCHE SCIENTIFIQUE, Paris (FR); SORBONNE UNIVERSITE, Paris (FR); INSTITUT NATIONAL DE LA SANTE ET DE LA RECHERCHE MEDICALE, Paris (FR); ASSISTANCE PUBLIQUE-HOPITAUX DE PARIS, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 18/095,943

(22) Filed: Jan. 11, 2023

(65) Prior Publication Data
US 2023/0145640 A1 May 11, 2023

Related U.S. Application Data (63) Continuation of application No. 16/622,066, filed as application No. PCT/EP2018/065559 on Jun. 12, 2018, now Pat. No. 11,576,371.

(30) Foreign Application Priority Data

Jun. 13, 2017 (FR) ...................... 1755321

(51) Int. Cl.
*G09B 23/30* (2006.01)
*A01N 1/02* (2006.01)

(52) U.S. Cl.
CPC ................... *A01N 1/0247* (2013.01)

(58) Field of Classification Search
CPC ...... G09B 23/28; G09B 23/30; G09B 23/303; G09B 23/306
See application file for complete search history.

(56) References Cited

U.S. PATENT DOCUMENTS 7,811,808 B2  10/2010  van der Plaats et al.
8,323,954 B2  12/2012  Kravitz et al.
(Continued)

FOREIGN PATENT DOCUMENTS

WO    0226034 A2    4/2002
WO    2005009125 A1    2/2005
(Continued)

OTHER PUBLICATIONS

International Search Report, dated Sep. 26, 2018, from corresponding PCT application No. PCT/EP2018/065559.
(Continued)

*Primary Examiner* — Kurt Fernstrom
(74) *Attorney, Agent, or Firm* — Seager, Tufte & Wickhem LLP (57) ABSTRACT

Disclosed is a device for the perfusion of an organ, including: a container of fluid, containing an organ bathed in the
(Continued)

perfusion fluid; a first path including an inlet, an outlet and a pump; and a second path including an inlet, an outlet and a pump. The "arterial" outlet of the first path has a diameter smaller than a diameter of the "portal" outlet of the second path. The device additionally includes, between the pump and the outlet of the first path and/or between the pump and the outlet of the second path, an oxygenation unit arranged to oxygenate the fluid emerging from the "arterial" outlet of the first path more than the fluid emerging from the "portal" outlet of the second path. The device can include a communication path between the first path and the second path in order to oxygenate the second path. Use in liver transplantation.

20 Claims, 2 Drawing Sheets (56) References Cited

U.S. PATENT DOCUMENTS

| | | |
|---|---|---|
| 2011/0065170 A1 | 3/2011 | Fondevila Campo et al. |
| 2014/0272923 A1 | 9/2014 | Mayer et al. |
| 2014/0322688 A1 | 10/2014 | Park et al. |
| 2014/0370490 A1 | 12/2014 | Iaizzo et al. |
| 2015/0322404 A1 | 11/2015 | Yarmush et al. |
| 2015/0342177 A1* | 12/2015 | Hassanein ............ C12M 29/10 435/284.1 |
| 2016/0111023 A1 | 4/2016 | Pybus et al. |
| 2016/0300509 A1 | 10/2016 | Spotnitz et al. |
| 2017/0000110 A1 | 1/2017 | Korkut et al. |
| 2019/0083045 A1 | 3/2019 | Borkholder et al. |

FOREIGN PATENT DOCUMENTS

| | | |
|---|---|---|
| WO | 2009138446 A2 | 11/2009 |
| WO | 2015138832 A1 | 9/2015 |
| WO | 2016090498 A1 | 6/2016 |
| WO | 2018015548 A2 | 1/2018 |

OTHER PUBLICATIONS

Weeder et al., "Machine perfusion in liver transplantation as a tool to prevent non-anastomotic biliary strictures: Rationale, current evidence and future directions", Journal of Hepatology, 2015, pp. 265-275, vol. 63, (Year 2015).

FR Search Report, dated Feb. 28, 2018, from corresponding FR application No. 1755321.

* cited by examiner

Organ Perfusion Device

CROSS-REFERENCE TO RELATED APPLICATIONS

This application is a continuation of U.S. patent application Ser. No. 16/622,066, filed Dec. 12, 2019, which is a 371 National Stage of International Application No. PCT/EP2018/065559, filed Jun. 12, 2018, which claims priority to French Application 1755321, filed Jun. 13, 2017, the entirety of which are incorporated herein by reference.

TECHNICAL FIELD

The present invention relates to a device for perfusing an organ.

Such a device makes it possible for example to preserve an organ before a transplant. The field of the invention is more particularly, but non-limitatively, that of liver transplantation.

STATE OF THE PRIOR ART

Liver transplantation makes it possible to cure certain primary liver cancers developed from cirrhosis and terminal liver diseases. Indications continue to increase. In order to increase the number of grafts available, it is necessary to turn to grafts having an extra risk, and that are therefore not commonly used because there is a risk of failure which is potentially fatal for the recipient. In order to reduce this risk of failure, the conventional method is to make the period between the removal and the graft as short as possible. A novel method consists of maintaining the organ to be grafted in circulation ex vivo in a perfusion medium so as to limit the harmful effects of ischemia-reperfusion. Also, in the latter case, increasing the preservation period can make it possible to increase the number of viability tests or even to "repair" certain livers.

The purpose of the present invention is to propose a device for perfusing an organ making it possible to:
  optimize the perfusion conditions of the organ and/or increase the preservation time of the organ, this time being able to be used for example to produce an accurate histological and biological evaluation; and/or
  develop functionality tests and consequently predict the risk of primary graft failure, and/or
  correct metabolic anomalies, macrovesicular steatosis in particular, by a perfusion medium and temperature, flow rate and pressure conditions that are specifically adapted.

DISCLOSURE OF THE INVENTION

This objective is achieved with a device for perfusing an organ, said device comprising:
  a fluid container, arranged in order to contain an organ immersed in a perfusion fluid,
  a first channel comprising an inlet arranged in order to be submerged in the container, an outlet arranged in order to be submerged in the container, and at least one pump arranged in order to circulate the fluid from the inlet to the outlet of the first channel,
  a second channel comprising an inlet arranged in order to be submerged in the container, an outlet arranged in order to be submerged in the container, and at least one pump arranged in order to circulate the fluid from the inlet to the outlet of the second channel, the outlet of the first channel being separate from the outlet of the second channel.

Preferably, the outlet of the first channel can have a diameter smaller than a diameter of the outlet of the second channel.

The device according to the invention can also comprise, between the pump of the first channel and the outlet of the first channel and/or between the pump of the second channel and the outlet of the second channel, means for oxygenating the fluid, preferably arranged in order to create a difference in the oxygenation of the fluid between the outlet of the first channel and the outlet of the second channel.

The oxygenation means can be arranged in order to give more oxygen to the fluid leaving the outlet of the first channel than the fluid leaving the outlet of the second channel.

The device according to the invention preferably comprises oxygenation means between the pump of the first channel and the outlet of the first channel.

The device according to the invention may not comprise means for oxygenating the fluid on the second channel.

The pump of the first channel and/or the pump of the second channel can be a peristaltic pump.

The device according to the invention can comprise means for regulating the temperature of the fluid between the pump of the second channel and the outlet of the second channel.

The device according to the invention may not comprise means for regulating the temperature of the fluid on the first channel.

The inlet of the first channel and the inlet of the second channel can be separate or one and the same common inlet.

The inlet of the first channel and the inlet of the second channel are preferably one and the same common inlet.

The device according to the invention can comprise a separator between the first channel and the second channel:
  between the common inlet and the pump of the first channel, and
  between the common inlet and the pump of the second channel.

The device according to the invention can comprise, between the common inlet and the separator, a pump common to the first channel and the second channel.

The device according to the invention can comprise, between the common inlet and the separator, a reservoir common to the first channel and the second channel.

The common reservoir is preferably placed between the common pump and the separator.

The common reservoir can be equipped with dialysis means, preferably arranged on a circuit parallel to the first channel and parallel to the second channel, the dialysis means comprising an inlet starting from the common reservoir and an outlet arriving in the common reservoir.

The common reservoir can be equipped with a bubble trap.

The inner diameter of the outlet of the first channel is preferably less than or equal to 12 mm and/or greater than or equal to 5 mm.

The inner diameter of the outlet of the second channel is preferably less than or equal to 12 mm and/or greater than or equal to 5 mm.

The pump of the first channel and the pump of the second channel can be arranged and/or programmed so that the fluid has a flow rate at the outlet of the second channel that is greater than a flow rate at the outlet of the first channel.

The inlet of the first channel and/or the inlet of the second channel may not have a cannula.

The device according to the invention can comprise means for regulating the temperature of the container.

The device according to the invention can comprise a first pressure sensor arranged in order to measure the pressure of the fluid in the first channel (preferably at less than 10 cm from the outlet of the first channel), between the pump of the first channel and the outlet of the first channel.

The device according to the invention can comprise means for controlling the pump of the first channel so as to regulate the flow rate of the pump of the first channel as a function of pressure measurement data provided by the first pressure sensor.

The device according to the invention can comprise a second pressure sensor arranged in order to measure the pressure of the fluid in the second channel (preferably at less than 10 cm from the outlet of the second channel), between the pump and the second channel and the outlet of the second channel.

The device according to the invention can comprise means for controlling the pump of the second channel so as to regulate the flow rate of the pump of the second channel as a function of pressure measurement data provided by the second pressure sensor.

The device according to the invention can comprise a communication channel between the first channel and the second channel, the communication channel preferably starting from the first channel between the oxygenation means and the outlet of the first channel. The communication channel can comprise a flowmeter arranged in order to measure the flow rate of fluid passing through the communication channel and/or means for regulating this flow rate.

According to another aspect of the invention, a method for perfusing an organ is proposed, implemented in a device comprising:
- a fluid container, containing an organ immersed in a perfusion fluid,
- a first channel comprising an inlet submerged in the container, an outlet submerged in the container, and at least one pump circulating the fluid from the inlet to the outlet of the first channel,
- a second channel comprising an inlet submerged in the container, an outlet submerged in the container, and at least one pump circulating the fluid from the inlet to the outlet of the second channel,
  - the outlet of the first channel being separate from the outlet of the second channel.

The outlet of the first channel preferably has a diameter smaller than a diameter of the outlet of the second channel.

The method according to the invention can comprise, between the pump of the first channel and the outlet of the first channel and/or between the pump of the second channel and the outlet of the second channel, creating, by oxygenation means, a difference in the oxygenation of the fluid between the outlet of the first channel and the outlet of the second channel.

Creating the difference in the oxygenation can give more oxygen to the fluid leaving the outlet of the first channel than to the fluid leaving the outlet of the second channel.

The method according to the invention can comprise oxygenation of the fluid between the pump of the first channel and the outlet of the first channel.

The method according to the invention may not comprise oxygenation of the fluid on the second channel.

The pump of the first channel and/or the pump of the second channel is preferably a peristaltic pump.

The method according to the invention can comprise regulating the temperature of the fluid between the pump of the second channel and the outlet of the second channel.

The method according to the invention may not comprise regulating the temperature of the fluid on the first channel.

The inlet of the first channel and the inlet of the second channel are preferably one and the same common inlet.

The device for implementing the method according to the invention can comprise a separator between the first channel and the second channel:
- between the common inlet and the pump of the first channel, and
- between the common inlet and the pump of the second channel.

The device for implementing the method according to the invention can comprise, between the common inlet and the separator, a pump common to the first channel and the second channel.

The device for implementing the method according to the invention can comprise, between the common inlet and the separator, a reservoir common to the first channel and the second channel.

The common reservoir can be placed between the common pump and the separator.

The method according to the invention can comprise dialysis, by dialysis means, of the fluid on a circuit parallel to the first channel and parallel to the second channel, the dialysis means comprising an inlet starting from the common reservoir and an outlet arriving in the common reservoir.

The common reservoir can be equipped with a bubble trap.

The inner diameter of the outlet of the first channel can be less than or equal to 12 mm and/or greater than or equal to 5 mm.

The inner diameter of the outlet of the second channel can be less than or equal to 12 mm and/or greater than or equal to 5 mm.

The fluid can have a flow rate at the outlet of the second channel that is greater than a flow rate at the outlet of the first channel.

The inlet of the first channel and/or the inlet of the second channel may not have a cannula.

The method according to the invention can comprise regulating the temperature of the container.

The method according to the invention can comprise measuring, by a first pressure sensor, the pressure of the fluid in the first channel (preferably at less than 10 cm from the outlet of the first channel), between the pump of the first channel and the outlet of the first channel. The method according to the invention can comprise controlling the pump of the first channel so as to regulate the flow rate of the pump of the first channel as a function of pressure measurement data provided by the first pressure sensor.

The method according to the invention can comprise measuring, by a second pressure sensor, the pressure of the fluid in the second channel (preferably at less than 10 cm from the outlet of the second channel), between the pump of the second channel and the outlet of the second channel. The method according to the invention can comprise controlling the pump of the second channel so as to regulate the flow rate of the pump of the second channel as a function of pressure measurement data provided by the second pressure sensor.

In the method according to the invention, the organ can be perfused by the fluid which is initially at a minimum temperature comprised between 0 and 10° C., before being reheated gradually by the fluid, this fluid gradually reaching a maximum temperature comprised between 33 and 43° C.

DESCRIPTION OF THE FIGURES AND EMBODIMENTS

Other advantages and features of the invention will become apparent on reading the detailed description of embodiments which are in no way limitative, and from the following attached drawings.

As this embodiment is in no way limitative, variants of the invention can in particular be considered comprising only a selection of the characteristics described or illustrated hereinafter, in isolation from the other characteristics described or illustrated (even if this selection is isolated within a phrase containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIG. 1 a first embodiment of the device 1 according to the invention will be described.

The device 1 is a device for perfusing an organ 2.

This organ 2, which does not form part of the device 1, is for example a liver (preferably human) intended for transplantation.

The device 1 comprises a fluid container 3, arranged in order to contain the organ (2) immersed in a perfusion fluid 4.

The fluid 4 does not form part of the device 1, but is a consumable of the device 1.

The container 3 is for example an open tank made from stainless steel.

The container 3 is preferably equipped with grips which make it possible to fasten one or more additional tubes (not shown) of suitable gauge(s), each additional tube (not shown) being connected to a natural channel (example: the bile duct for the liver, the ureter for a kidney) and the collection being carried out by gravity in a receptacle placed outside and below the container 3.

The container 3 is for example a BackTherm container, Connectorate AG, Bernstrasse 390 CH-8953 Dietkon/Switzerland.

The perfusion fluid 4 is preferably an acellular organ preservation liquid or a buffered physiological liquid, with or without added molecules or cells for transporting oxygen or for a pharmacological effect.

The device 1 comprises a first channel 5 comprising:
  an inlet 51 arranged in order to be submerged in the container 3,
  an outlet 52 (called arterial outlet) arranged in order to be submerged in the container 3, and
  at least one pump 53 arranged in order to circulate the fluid 4 from the inlet 51 to the outlet 52 of the first channel 5.

The inner diameter of the outlet 52 of the first channel 5 is less than or equal to 12 mm (or ⅜ inch) and/or greater than or equal to 5 mm (or ⅛ inch).

The different elements 51, 10, 11, 9, 53, 55, 7 of the first channel 5 are preferably connected by tubes made from silicone and/or polyvinyl chloride (PVC).

The inner diameter of these tubes of the first channel 5 from its inlet 51 to its outlet 52 is less than or equal to 12 mm (or ⅜ inch) and/or greater than or equal to 5 mm (or ⅛ inch).

The device 1 comprises a second channel 6 comprising:
  an inlet 61 arranged in order to be submerged in the container 3,
  an outlet 62 (called portal outlet) arranged in order to be submerged in the container 3, and
  at least one pump 63 arranged in order to circulate the fluid 4 from the inlet 61 to the outlet 62 of the second channel 6.

The inner diameter of the outlet 62 of the second channel 6 is less than or equal to 12 mm (or ⅜ inch) and/or greater than or equal to 5 mm (or ⅛ inch).

The different elements 61, 10, 11, 9, 63, 65, 8 of the second channel 6 are preferably connected by tubes made from silicone and/or polyvinyl chloride (PVC).

The inner diameter of these tubes of the second channel 6 from its inlet 61 to its outlet 62 is less than or equal to 12 mm (or ⅜ inch) and/or greater than or equal to 5 mm (or ⅛ inch).

The outlet 52 of the first channel is separate from the outlet 62 of the second channel.

The inlet 51 of the first channel 5 does not have a cannula. It is a simple tube end with or without a connector suitable for the diameter of the tube on at least one of its ends.

By cannula is meant a tube that is specifically adapted to be inserted into an organic natural vessel or an organic natural duct.

The inlet 61 of the second channel 6 does not have a cannula. It is a simple tube end.

The outlet 52 of the first channel 5 does not have a cannula.

The outlet 62 of the second channel 6 does not have a cannula.

The arterial outlet 52 of the first channel 5 has a diameter D1 that is smaller than a diameter D2 of the portal outlet 62 of the second channel 6, preferably by at least 25% i.e. $(D2-D1)/D2 > 25\%$.

The device 1 also comprises means 7 for oxygenating the fluid 4 arranged and/or programmed and/or adjusted in order to increase the oxygen level in the fluid 4 passing through the means 7.

The oxygenation means 7 are arranged and/or programmed and/or adjusted in order to create a difference in the oxygenation of the fluid 4 between the outlet 52 of the first channel 5 and the outlet 62 of the second channel 6.

More specifically, the oxygenation means 7 are arranged and/or programmed and/or adjusted in order to give more oxygen to the fluid 4 leaving the outlet 52 of the first channel 5 than to the fluid 4 leaving the outlet 62 of the second channel 6. In other words, the oxygenation means 7 are arranged and/or programmed and/or adjusted so that the final total concentration C1 of oxygen dissolved in the fluid 4 leaving the outlet 52 of the first channel 5 is greater than the final total concentration C2 of oxygen dissolved in the fluid 4 leaving the outlet 62 of the second channel 6, preferably by at least 25% or even 50% i.e. $(C1-C2)/C1 > 25\%$ or even 50%.

Thus, due to the means 7, promoting oxygenation of the arterial channel 5 in comparison with the portal channel 6, the organ perfusion conditions are improved under natural physiological conditions.

The organ preservation time is improved.

The oxygenation means 7 are situated in the first channel 5.

The oxygenation means 7 are situated in the first channel 5 between the pump 53 of the first channel 5 and the outlet 52 of the first channel 5.

The oxygenation means 7 are for example an oxygenator referenced Dideco D902 ECMO Phisio ND Lilliput (Mirandola, Italy). The device 1 does not comprise oxygenation means on the second channel 6. In other words, the device 1 does not comprise on the second channel 6 means arranged in order to increase, on the second channel 6, the concentration of oxygen dissolved in the fluid 4.

The pump 53 of the first channel 5 is a peristaltic pump, for example a cardioplegia pump of a Stokert SIII or S5 or SC (Sorin Group Livallova) extracorporeal circulation (ECC) console or subsequent model.

Similarly, the pump 63 of the second channel 6 is a peristaltic pump, for example a cardioplegia pump of a Stokert SIII or S5 or SC (Sorin Group/Livallova) extracorporeal circulation (ECC) console or subsequent model.

The device 1 comprises, in the second channel 6, means 8 for regulating the temperature of the fluid situated between the pump 63 of the second channel 6 and the outlet 62 of the second channel 6, over a range of temperatures from at least −10° C. to +40° C., or preferably at least between 4° C. and 37° C.

The temperature regulation means 8 comprise for example a heat exchanger referenced "CSC 14 cardioplegia heat exchanger" (Sorin Group/Livallova).

On the other hand, the device 1 does not comprise means for regulating the temperature of the fluid 4 on the first channel 5.

In a particularly astute manner, the structure of the device 1 is thus rationalized, manufacturing is simplified, and costs are reduced:

by only providing oxygenation means 7 on the first channel 5 in order to create an imbalance close to natural conditions, and/or by only providing temperature regulation means 8 on the second channel 6 which has the higher flow rate.

Figure 1:
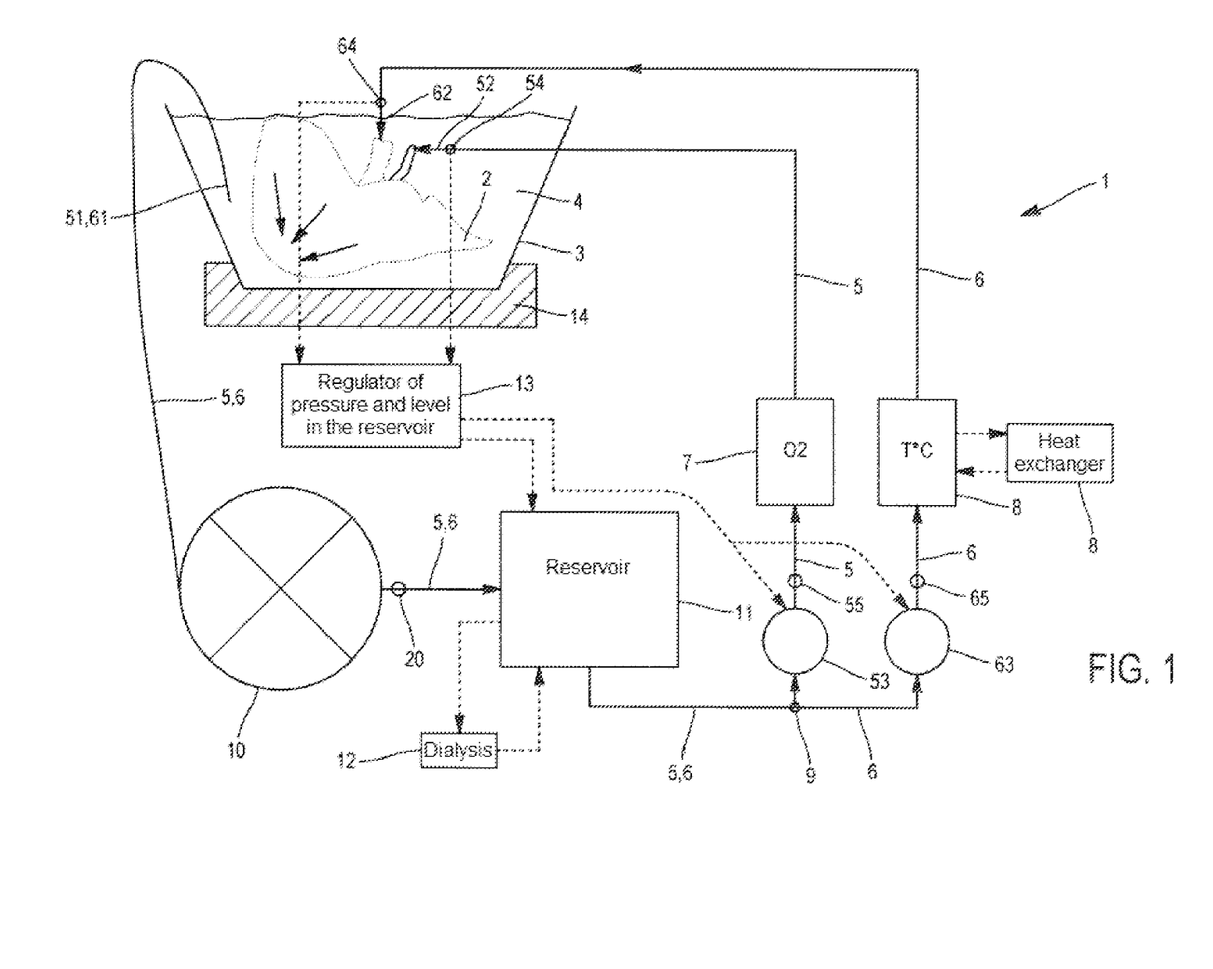
FIG. 1 is a diagrammatic view of a first embodiment of the invention, which is the preferred embodiment of the invention.

It is noted in FIG. 1 that the inlet 51 of the first channel 5 and the inlet 61 of the second channel 6 are one and the same common inlet.

The device 1 comprises:

between the common inlet 51, 61 and the pump 53 of the first channel 5, and between the common inlet 51, 61 and the pump 63 of the second channel 6, a separator 9 between the first channel 5 and the second channel 6.

In other words, the first channel 5 and the second channel 6 are not totally common and merged, but only over a portion starting from the common inlet 51, 61 and up to the separator 9.

The pumps 53 and 63 are separate.

The pump 53 is situated on the first channel 5 after the separator 9, but not on the second channel 6.

The pump 63 is situated on the second channel 6 after the separator 9, but not on the first channel 5.

The device 1 comprises, between the common inlet 51, 61 and the separator 9, a pump 10 common to the first channel 5 and the second channel 6.

The common pump 10 is a peristaltic pump, for example a main pump of a Stokert SIII or S5 or SC (Sorin Group/ Livallova) extracorporeal circulation (ECC) console or subsequent model.

The device 1 comprises, between the common inlet 51, 61 and the separator 9, a reservoir 11 common to the first channel 5 and the second channel 6.

The reservoir 11 is for example a reservoir 11 referenced D 754 PH ND (Sorin Group).

The common reservoir 11 is placed between the common pump 10 and the separator 9.

The common reservoir 11 is equipped with dialysis means 12 placed on a circuit parallel to the first channel 5 and parallel to the second channel 6.

The dialysis means 12 comprise an inlet starting from the common reservoir 11 and an outlet arriving in the common reservoir 11.

The dialysis means comprise for example a Polyflux 2H artificial kidney dialyzer (Gambro/Baxter) as well as a dialysis system of the Artis type.

The common reservoir 11 is equipped with a bubble trap (not shown) arranged in order to remove bubbles of gas from the fluid 4 passing through the reservoir 11. The device 1 does not comprise another bubble trap on the channels 5, 6 between the reservoir 11 and the outlets 52, 62.

The pump 53 of the first channel and the pump 63 of the second channel are arranged and/or programmed (via the control means 13 described below) so that the fluid 4 has a flow rate Q65 at the outlet 62 of the second channel that is greater than the flow rate Q55 at the outlet 52 of the first channel, preferably by at least 25% i.e. (Q65−Q55)/ Q65>25%.

The device 1 is arranged and/or programmed in order to adjust (via the means 13 described below) the flow rate of each of the pumps from the pump 53 of the first channel and the pump 63 of the second channel independently of one another. This makes it possible to be able to act separately on the arterial 5 and portal 6 channels in particular for functionality tests and/or in order to optimize the perfusion conditions to which the organ 2 is subjected.

More specifically, the device 1 is arranged and/or programmed in order to adjust (via the means 13 described below) the flow rate of each of the pumps from the pump 10, the pump 53 of the first channel and the pump 63 of the second channel independently of one another.

The device 1 comprises means 14 for regulating the temperature of the container 3 (and thus regulating the temperature of the fluid 4 and/or of the organ 2 contained in the container 3), over a range of temperatures from at least −10° C. to +40° C., or preferably of at least between 4° C. and 37° C.

The means 14 typically comprise a regulator included in the electronics system of the BackTherm (BackTherm, Connectorate AG, Bernstrasse 390 CH-8953 Dietkon/Switzerland) which bears the container 3.

The device 1 comprises a first pressure sensor 54 arranged in order to measure the pressure of the fluid 4 in the first channel 5 at less than 10 cm from the outlet 52 of the first channel, between the pump 53 of the first channel 5 and the outlet 52 of the first channel 5.

The sensor 54 is for example a sensor referenced Edwards Lifesciences TruWave™ (EdisonStr. 6 85716 Unterschleissheim, Germany).

The device 1 comprises means 13 arranged and/or programmed to control the pump 53 of the first channel 5 so as to regulate the flow rate of the pump 53 of the first channel 5 as a function of pressure measurement data provided by the first pressure sensor 54.

The device 1 comprises a second pressure sensor 64 arranged in order to measure the pressure of the fluid 4 in the second channel 6 at less than 10 cm from the outlet 62 of the second channel, between the pump 63 of the second channel 6 and the outlet 62 of the second channel 6.

The sensor 64 is for example a sensor referenced Edwards Lifesciences TruWave™ (EdisonStr. 6 85716 Unterschleissheim, Germany).

The device 1 comprises means 13 arranged and/or programmed to control the pump 63 of the second channel 6 so as to regulate the flow rate of the pump 63 of the second channel 6 as a function of pressure measurement data provided by the second pressure sensor 64.

The means 13 only comprise technical means.

The means 13 comprise at least one computer, a central or calculation unit, an analogue electronic circuit (preferably dedicated), a digital electronic circuit (preferably dedicated), a microprocessor (preferably dedicated) and/or software means.

In this non-limitative embodiment example of the device 1, the means 13 can for example comprise or be adapted from a control system of a Stokert SIII or S5 or SC (Sorin Group/Livallova) extracorporeal circulation (ECC) console or subsequent model.

The control means 13 are arranged and/or programmed in order to:
  send a command to the pump 53, as a function of the pressure measurement data provided by the pressure sensor 54, until the pressure measured by the sensor 54 corresponds to or is less than a first pressure setting (called "arterial setting"), and/or
  send a command to the pump 63, as a function of pressure measurement data provided by the second pressure sensor 64, until the pressure measured by the sensor 64 corresponds to or is less than a second pressure setting (called "portal setting").

The control means comprise means for storing the first pressure setting (called "arterial setting") and the second pressure setting (called "portal setting"), and/or means (buttons, touch screen, etc.) for input by a user of the first pressure setting (called "arterial setting") and the second pressure setting (called "portal setting").

The reservoir 11 comprises control means (not shown, but able for example to comprise the control means 13) arranged and/or programmed in order to:
  trigger an alarm (acoustic, visual, or other) and/or stop the pump 10 if the level of fluid 4 in the reservoir 11 exceeds a maximum threshold, and/or
  trigger an alarm (acoustic, visual, or other) and/or stop the pumps 53 and 63 if the level of fluid 4 in the reservoir 11 is less than a minimum threshold.

The device 1 also comprises a flow rate sensor 55 situated on the first channel 5 downstream of the pump 53 (more specifically between the pump 53 and the outlet 52, more specifically between the pump 53 and the means 7) and arranged in order to measure the flow rate Q55 of the fluid 4 on the first channel 5 downstream of the pump 53 (more specifically between the pump 53 and the outlet 52, more specifically between the pump 53 and the means 7).

The device 1 also comprises a flow rate sensor 65 situated on the second channel 6 downstream of the pump 63 (more specifically between the pump 63 and the outlet 62, more specifically between the pump 63 and the means 8) and arranged in order to measure the flow rate Q65 of the fluid 4 on the second channel 6 downstream of the pump 63 (more specifically between the pump 63 and the outlet 62, more specifically between the pump 63 and the means 8).

The device 1 also comprises a flow rate sensor 20 situated on the common part of the first channel 5 and the second channel 6 downstream of the pump 10 (more specifically between the pump 10 and the separator 9, more specifically between the pump 10 and the reservoir 11) and arranged in order to measure the flow rate Q20 of the fluid 4 on the common part of the first channel 5 and the second channel 6 downstream of the pump 10 (more specifically between the pump 10 and the separator 9, more specifically between the pump 10 and the reservoir 11).

Each of the flow rate sensors 20, 55, 65 is for example an external electromagnetic flowmeter or means of the Stokert SIII or S5 or SC (Sorin Group/Livallova) (ECC) Console which calculates the flow rate as a function of the rotational speed of each pump respectively 10, 53, 63 and the diameter of the tubes.

The device 1 also comprises means (not shown, but able for example to comprise the control means 13) arranged and/or programmed in order to trigger an alarm (acoustic, visual or other) and/or modify flow rate controls of the pumps 10, 55 and/or 65 as a function of the sign and/or of the value of:

$$(Q55-Q65)-Q10.$$

This makes it possible to avoid the container 3 overflowing or emptying.

Also, the device 1 makes it possible to correct metabolic anomalies of the organ 2, macrovesicular steatosis in particular, by a specifically adapted perfusion medium and temperature (via the means 8, 14), flow rate (via the sensors 55 and 65 and the means 13) and pressure (via the sensors 54 and 64 and the means 13) conditions.

A method according to the invention for perfusing the organ 2, implemented in the device 1, will now be described. For this method:
  the container 3 contains the organ 2 which is immersed in the perfusion fluid 4,
  the inlet 51 is submerged in the container 3, the outlet 52 is submerged in the container 3, and the pump 53 circulates the fluid from the inlet 51 to the outlet 52 of the first channel 5,
  the inlet 61 is submerged in the container 3, the outlet 62 is submerged in the container 3, and the pump 63 circulates the fluid from the inlet 61 to the outlet 62 of the second channel 6.

The method comprises creating, by oxygenation means 7, a difference in the oxygenation of the fluid 4 between the outlet 52 of the first channel 5 and the outlet 62 of the second channel 6.

In other words, the difference in the oxygenation is such that the final total concentration C1 of oxygen dissolved in the fluid 4 leaving the outlet 52 of the first channel 5 is greater than the final total concentration C2 of oxygen dissolved in the fluid 4 leaving the outlet 62 of the second channel 6, preferably by at least 25% or even 50% i.e. (C1−C2)/C1>25% or even 50%.

This creating a difference in the oxygenation is carried out by injecting and dissolving oxygen in the fluid 4 (preferably only) between the pump 53 of the first channel 5 and the outlet 52 of the first channel 5.

Creating the difference in the oxygenation gives more oxygen to the fluid 4 leaving the outlet 52 of the first channel 5 than to the fluid 4 leaving the outlet 62 of the second channel 6.

The method comprises oxygenating, by the means 7, the fluid 4 between the pump 53 of the first channel 5 and the outlet 52 of the first channel 5.

The method does not comprise oxygenating the fluid 4 on the second channel 6.

The method comprises regulating, by the means 8, the temperature of the fluid 4 between the pump 63 of the second channel 6 and the outlet 62 of the second channel 6.

The method does not comprise regulating the temperature of the fluid 4 over the first channel 5.

The method comprises dialysis, by dialysis means 12, of the fluid 4 on the circuit parallel to the first channel 5 and parallel to the second channel 6.

The method comprises regulating, by the means 14, the temperature of the container 3 and thus of the liquid 4 and the organ 2 contained in the container 3.

The method comprises controlling, by the means 13, the pump 53 of the first channel 5 and the pump 63 of the second channel 6 such that the fluid 4 has a flow rate Q65 at the outlet 62 of the second channel 6 greater than a flow rate Q55 at the outlet 52 of the first channel 5.

During this method the fluid has a flow rate Q65 at the outlet 62 of the second channel that is greater than a flow rate Q55 at the outlet 52 of the first channel 5, preferably of at least 25% i.e. (Q65−Q55)/Q65>25%.

The method comprises triggering an alarm (acoustic, visual or other) and/or modifying the flow rate controls of the pumps 10, 55 and/or 65 as a function of the sign and/or of the value of:

(Q55−Q65)−Q10

This makes it possible to avoid the container 3 overflowing or emptying.

The method comprises measuring, by the first pressure sensor 54, the pressure of the fluid 4 in the first channel 5 (at less than 10 cm from the outlet 52 of the first channel 5), between the pump 53 of the first channel 5 and the outlet 52 of the first channel 5.

The method comprises controlling, by the means 13, the pump 53 of the first channel so as to regulate the flow rate Q55 of the pump 53 of the first channel 5 as a function of pressure measurement data provided by the first pressure sensor 54.

The method comprises measuring, by the second pressure sensor 64, the pressure of the fluid 4 in the second channel 6 (at less than 10 cm from the outlet 62 of the second channel 6), between the pump 63 of the second channel 6 and the outlet 62 of the second channel 6.

The method comprises controlling, by the means 13, the pump 63 of the second channel so as to regulate the flow rate Q65 of the pump of the second channel 6 as a function of pressure measurement data provided by the second pressure sensor 64.

More specifically, with regard to regulating the flow rates Q55 and Q65, the method comprises:
  sending, by the means 13, a command to the pump 53, as a function of pressure measurement data provided by the pressure sensor 54, until the pressure measured by the sensor 54 corresponds to or is less than the first pressure setting (called "arterial setting"), and/or
  sending, by the means 13, a command to the pump 63, as a function of pressure measurement data provided by the second pressure sensor 64, until the pressure measured by the sensor 64 corresponds to or is less than the second pressure setting (called "portal setting").

The method comprises:
  triggering an alarm (acoustic, visual, or other) and/or stopping the pump 10 if the level of fluid 4 in the reservoir 11 exceeds a maximum threshold, and/or
  triggering an alarm (acoustic, visual, or other) and/or stopping the pumps 53 and 63 if the level of fluid 4 in the reservoir 11 is less than a minimum threshold.

In this embodiment of the method according to the invention, the means 8 for regulating the temperature of the fluid are used in order to regulate the temperature of the fluid over an entire range:
  starting from a minimum temperature typically comprised between 0 and 10° C., preferably between 2° C. and 8° C., preferably between 3° C. and 6° C., typically equal to 4° C.,
  up to a maximum temperature typically comprised between 33 and 43° C., preferably between 35° C. and 41° C., preferably between 36° C. and 39° C., typically equal to 37° C.

In this embodiment of the method according to the invention, the organ 2 is perfused by the fluid which is initially at the level of the means 8 at the minimum temperature (typically 4° C.; in order to allow the organ 2 to rebuild stores of oxygen), before being gradually reheated by the fluid, this fluid gradually reaching the maximum temperature (typically 37° C.) at the level of the means 8.

This distinguishes the invention with respect to normothermic use as can be the case for the devices of the prior art.

Of course, the invention is not limited to the examples which have just been described and numerous adjustments can be made to these examples without exceeding the scope of the invention.

Figure 2:
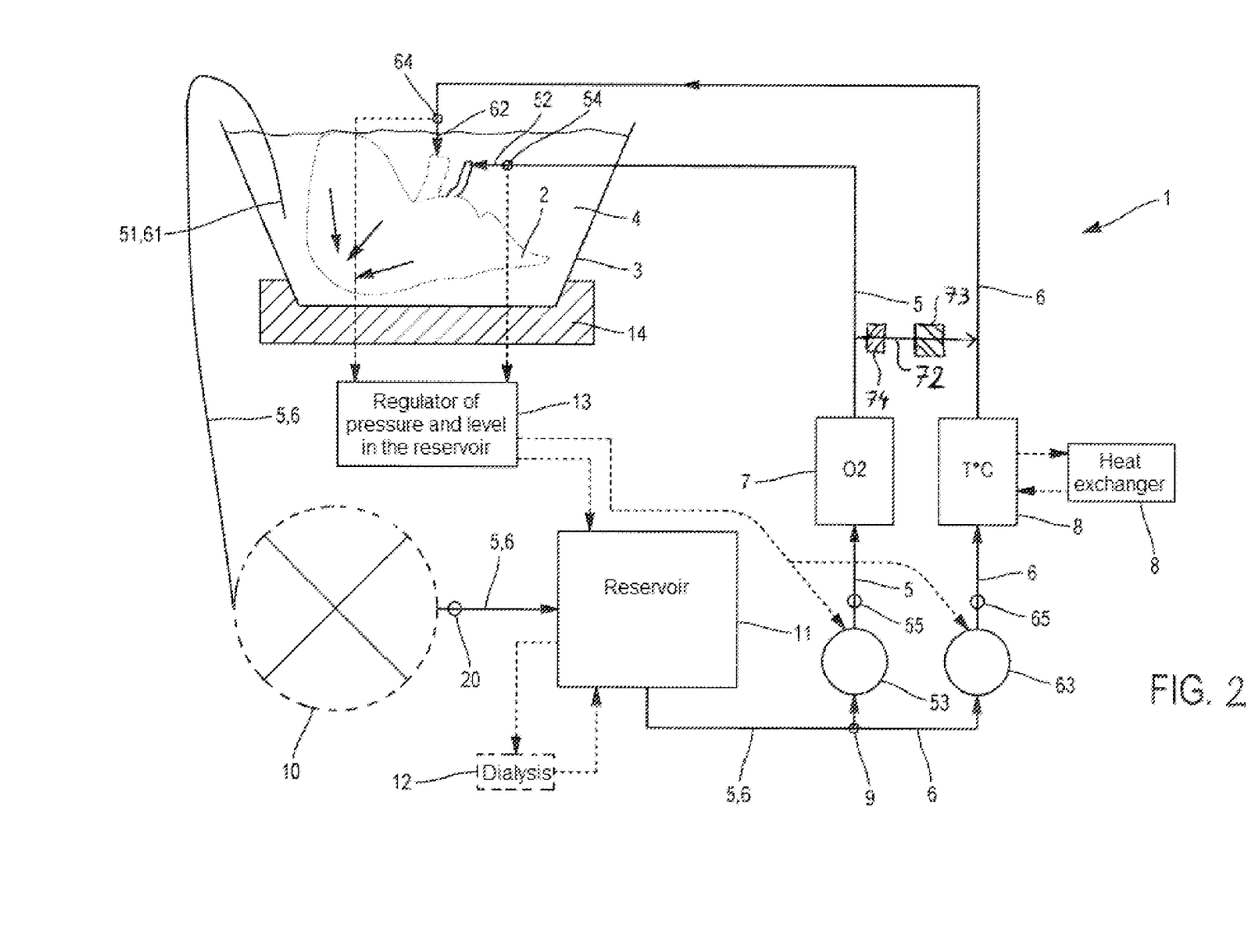
FIG. 2 illustrates different variants or modifications, each of which can be implemented in the first embodiment of the invention independently or in combination with other variants.

For example, non-limitatively, in variants of the device 1 which can be combined with one another and/or the method previously illustrated:
  the device 1 can also comprise, in the second channel 6, between the pump 63 of the second channel 6 and the outlet 62 of the second channel 6, means 7 for oxygenating the fluid 4, arranged in order to increase the level of oxygen in the fluid 4 passing through the means 7 and/or for creating the difference in the oxygenation of the fluid between the outlet 52 of the first channel and the outlet 62 of the second channel, and/or
  the device 1 can also comprise in the first channel 5, between the pump 53 of the first channel 5 and the outlet 52 of the first channel 5, means for regulating the temperature of the fluid 4, and/or
  the dialysis means 12 can be removed, and/or
  with reference to FIG. 2, the device 1 can also comprise, a communication channel 72 between the first channel 5 and the second channel 6, after the oxygenator 7 (i.e. the channel 72 starting from the first channel 5 between the oxygenation means 7 and the outlet 52 and arriving in the second channel 6 preferably between the pump 63 of the second channel 6 and the outlet 62 of the second channel 6). Even more preferably, the channel 72 arrives in the second channel 6 between the means 8 for regulating the temperature of the fluid and the outlet 62 of the second channel 6. This channel 72 is arranged in order to guide (and guides, in the embodiment of the method according to the invention of this variant) fluid from the first channel 5 to the second channel 6. This channel 72 is arranged in order to oxygenate the second channel 6, so as to reduce or better control or refine the difference in the oxygenation between the two channels 5, 6 and thus approach the physiological conditions of the organ 2 with even closer accuracy. A flowmeter 73 can be connected to the channel 72, this flowmeter 73 being arranged in order to measure the flow rate of fluid passing through the channel 72. In addition to this flowmeter, means 74 for regulating this flow rate (comprising for example a valve) can be added in order to control or modify the flow rate of this communication channel 72. The flowmeter 73 and the means 74 for controlling the flow rate are optional, and/or—the pump 10 can be removed, and replaced by a gravity system, the container 3 being placed in a raised position with respect to the reservoir 11. Of course, the various characteristics, forms, variants and embodiments of the invention can be combined with one another in various combinations, provided that they are not incompatible or mutually exclusive. In particular, all the variants and embodiments described previously can be combined with each other.

The invention claimed is:

1. An organ perfusion device, comprising:
   a fluid container configured to hold an organ submerged in a perfusion fluid having a concentration of oxygen dissolved therein;
   a first fluid channel comprising a first inlet configured to be submerged in the container, a first outlet configured to be submerged in the container, and a first pump configured to circulate the perfusion fluid from the first inlet to the first outlet;
   a second fluid channel comprising a second inlet configured to be submerged in the container, a second outlet configured to be submerged in the container, and a second pump configured to circulate the perfusion fluid from the second inlet to the second outlet; and
   an oxygenation means configured to increase the concentration of oxygen dissolved in the perfusion fluid;
   wherein the concentration of oxygen dissolved in the perfusion fluid leaving the first outlet is greater than the concentration of oxygen dissolved in the perfusion fluid leaving the second outlet.

2. The organ perfusion device of claim 1, wherein the concentration of oxygen dissolved in the perfusion fluid leaving the first outlet is at least 25% greater than the concentration of oxygen dissolved in the perfusion fluid leaving the second outlet.

3. The organ perfusion device of claim 1, wherein the oxygenation means is disposed on the first fluid channel between the first pump and the first outlet.

4. The organ perfusion device of claim 3, wherein the oxygenation means is only disposed on the first fluid channel.

5. The organ perfusion device of claim 3, further comprising a fluid communication channel extending from the first fluid channel, downstream of the oxygenation means, to the second fluid channel.

6. The organ perfusion device of claim 1, wherein the first outlet has a smaller inner diameter than the second outlet.

7. An organ perfusion device, comprising:
   a fluid container configured to hold an organ submerged in a perfusion fluid having a concentration of oxygen dissolved therein;
   a first channel comprising a first inlet configured to be submerged in the fluid container, a first outlet configured to be configured to be connected to the organ, and a first pump configured to circulate the perfusion fluid from the first inlet to the first outlet;
   a second channel comprising a second inlet configured to be submerged in the fluid container, a second outlet configured to be configured to be connected to the organ, and a second pump configured to circulate the perfusion fluid from the second inlet to the second outlet; and
   an oxygenation means configured to inject and dissolve oxygen in the perfusion fluid;
   wherein the oxygenation means is configured to create a difference between the concentration of oxygen dissolved in the perfusion fluid leaving the first outlet and the concentration of oxygen dissolved in the perfusion fluid leaving the second outlet.

8. The organ perfusion device of claim 7, wherein the perfusion fluid has a first flow rate at the first outlet and a second flow rate at the second outlet, the second flow rate being greater than the first flow rate.

9. The organ perfusion device of claim 8, wherein the second flow rate at the second outlet is at least 25% greater than the first flow rate at the first outlet.

10. The organ perfusion device of claim 7, wherein the concentration of oxygen dissolved in the perfusion fluid leaving the first outlet is greater than the concentration of oxygen dissolved in the perfusion fluid leaving the second outlet.

11. The organ perfusion device of claim 7, further comprising a temperature regulation means disposed on the second fluid channel between the second pump and the second outlet.

12. The organ perfusion device of claim 11, wherein the temperature regulation means is only disposed on the second fluid channel.

13. A method of perfusing an organ submerged in a fluid container in a perfusion fluid having a concentration of oxygen dissolved therein, the method comprising:
   submerging a first outlet of a first fluid channel in the fluid container, the first fluid channel comprising a first inlet submerged in the fluid container and a first pump circulating the perfusion fluid from the first inlet to the first outlet;
   submerging a second outlet of a second fluid channel in the fluid container, the second fluid channel comprising a second inlet submerged in the fluid container and a second pump circulating the perfusion fluid from the second inlet to the second outlet; and
   creating a difference between the concentration of oxygen dissolved in the perfusion fluid leaving the first outlet and the concentration of oxygen dissolved in the perfusion fluid leaving the second outlet.

14. The method of claim 13, wherein submerging the first outlet in the fluid container includes coupling the first outlet to the organ.

15. The method of claim 13, wherein submerging the second outlet in the fluid container includes coupling the second outlet to the organ.

16. The method of claim 13, wherein creating the difference between the concentration of oxygen dissolved in the perfusion fluid leaving the first outlet and the concentration of oxygen dissolved in the perfusion fluid leaving the second outlet includes giving more oxygen to the perfusion fluid leaving the first outlet than the perfusion fluid leaving the second outlet.

17. The method of claim 16, wherein creating the difference between the concentration of oxygen dissolved in the perfusion fluid leaving the first outlet and the concentration of oxygen dissolved in the perfusion fluid leaving the second outlet includes giving at least 25% more oxygen to the perfusion fluid leaving the first outlet than the perfusion fluid leaving the second outlet.

18. The method of claim 13, further comprising regulating a temperature of the perfusion fluid within the second fluid channel between the second pump and the second outlet.

19. The method of claim 13, further comprising controlling the first pump and the second pump such that the perfusion fluid has a first flow rate at the first outlet and a second flow rate at the second outlet, the second flow rate being greater than the first flow rate.

20. The method of claim 19, wherein the second flow rate at the second outlet is at least 25% greater than the first flow rate at the first outlet.

* * * * *